United States Patent [19]
Lechner

[11] 3,883,758
[45] May 13, 1975

[54] ONE-WAY DIRECTION CONTROL FOR SYNCHRONOUS MOTORS

[75] Inventor: Walter L. Lechner, New Providence, R.I.

[73] Assignee: Engler Instrument Company, Jersey City, N.J.

[22] Filed: May 24, 1974

[21] Appl. No.: 473,069

[52] U.S. Cl. .................. 310/41; 310/83; 310/162
[51] Int. Cl. .............................................. H02k 7/10
[58] Field of Search ................ 310/41, 83, 162–65; 335/205

[56] References Cited
UNITED STATES PATENTS

| | | | |
|---|---|---|---|
| 2,436,231 | 2/1948 | Schellens | 310/41 |
| 2,722,297 | 11/1955 | Gates, Jr. | 310/41 UX |
| 2,874,809 | 2/1959 | Poole | 310/41 UX |
| 3,842,296 | 10/1974 | Gerber | 310/162 X |

Primary Examiner—Donovan F. Duggan
Attorney, Agent, or Firm—Harry B. Rook

[57] ABSTRACT

In a one-way direction control for synchronous motors that are capable of starting in either direction when energized, the motor shaft is drivingly connected to a rotatable driving element that has a circumferential smooth surface through which and one end of said element opens a notch at one side of which is a lug coactive with a pinion having a hub and primary and secondary teeth which are of different lengths longitudinally of the hub and have a relation to each other and to said circumferential surface and to said notch and said lug such as to permit free continuous rotation of the driving element and said motor shaft in one direction and to block rotation in the opposite direction.

7 Claims, 11 Drawing Figures

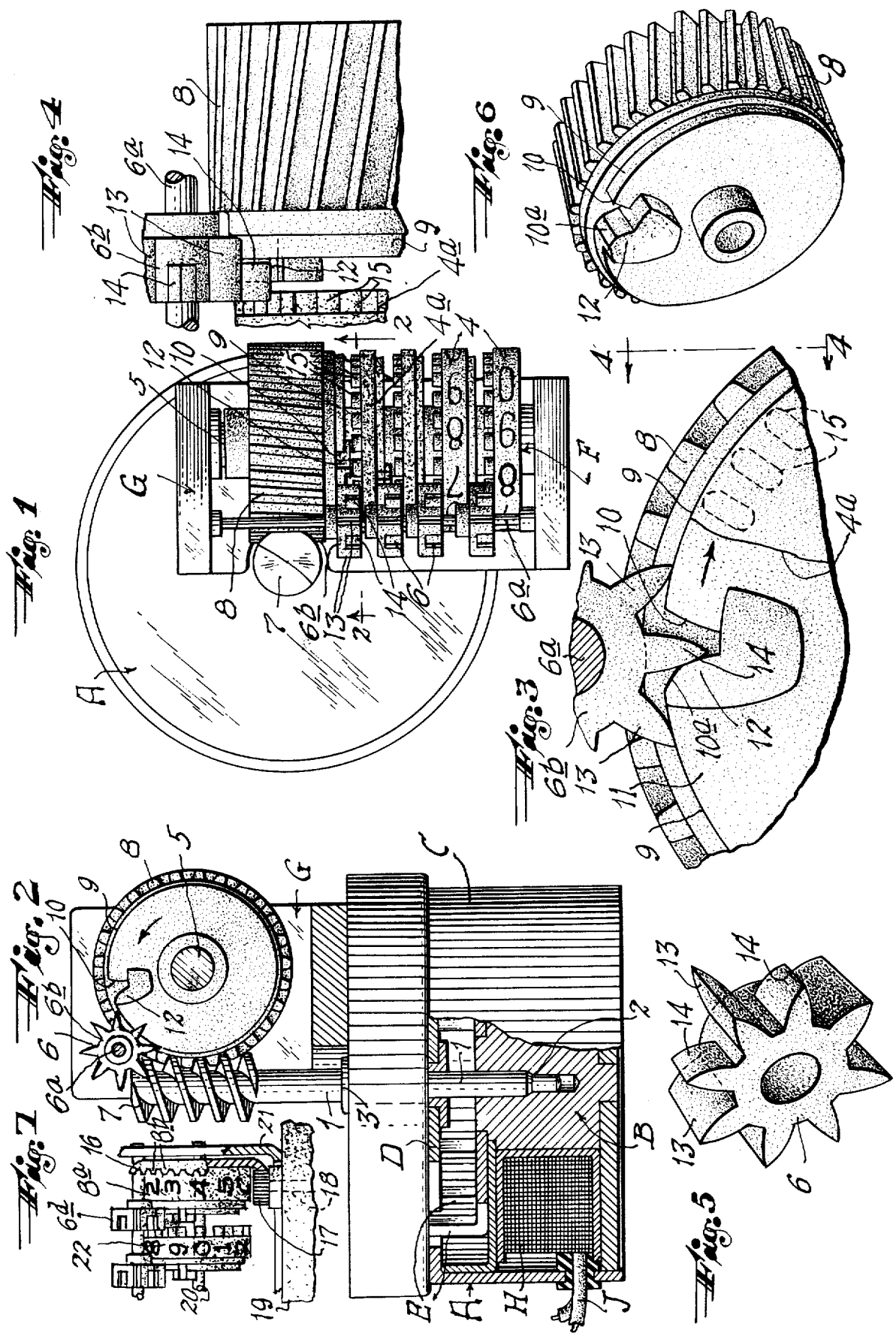

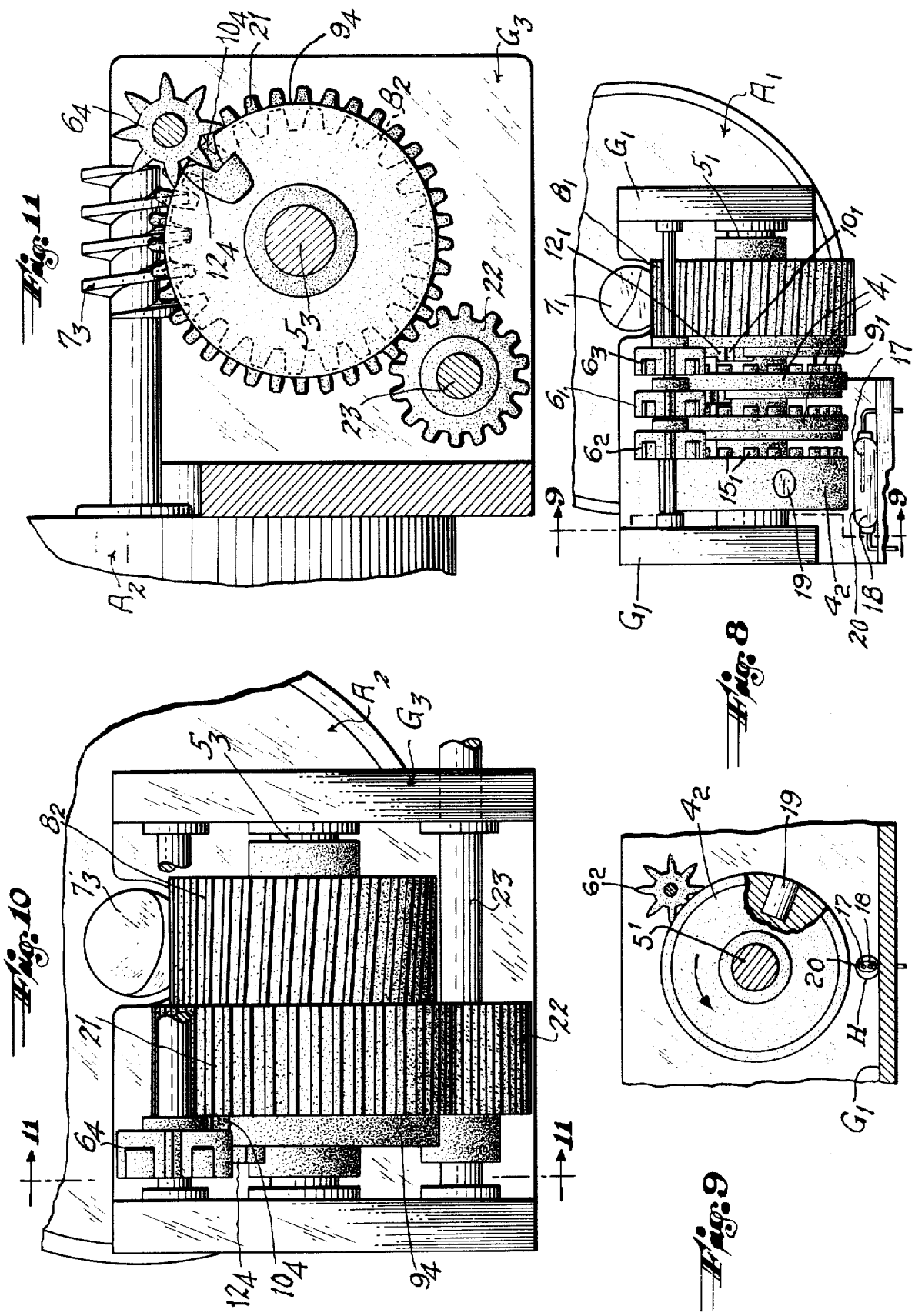

ONE-WAY DIRECTION CONTROL FOR SYNCHRONOUS MOTORS

BACKGROUND OF THE INVENTION

This invention relates to a one-way rotation control for use with a small low torque synchronous motor of the type in which the motor will run in either a clockwise or a counter-clockwise direction when current is applied, for the purpose of insuring unidirectional driving of a connected load. Such motors are useful for driving, for example, mechanical counters, elapsed time hour meters, record charts, clocks, timing switches, unidirectional drive mechanisms and the like.

In my copending application, Ser. No. 404,621, is disclosed a drive means that includes a worm on the shaft of a self-starting synchronous motor, and a spiral gear meshing with said worm, said worm and said spiral gear having coactive modified teeth which provide for free rotation of the shaft in one direction to drive the gear in known manner but coact to block rotation of the shaft in the opposite direction.

The prior art includes one-way directional control for synchronous motors, for example, as exemplified by U.S. Pat. Nos. 2,436,231 and 3,525,888 and 3,200,915. Some of the known devices include meshing spur gears that preferably are separate from the driving gear train and have their teeth modified such as to cause blocking of the motor shaft rotation when urged in the incorrect direction, while other devices include ratchets, or embody cam programming means on the shaft coacting with pawls mounted on the motor casing, and the like.

It is desirable to provide a one-way direction control for synchronous motors that is simpler, easier and less expensive to produce and especially such a device that can be easily and relatively inexpensively embodied in mechanical counters, unidirectional intermittent driving apparatus and elapsed time hour meters, and the like.

The prior art devices are complicated and expensive to produce, and require parts that are separate from and in addition to the driving gear train of the device to be driven.

SUMMARY OF THE INVENTION

An important object of the invention is to provide a one-way direction control for synchronous motors that is simpler, easier and less expensive to produce than known devices of this character, and especially to provide such a device that is embodied in and comprises a part of the driving gear train in mechanical counters, elapsed time hour meters, unidirectional intermittent driving mechanisms and the like.

The invention contemplates the motor shaft drivingly connected to a driving element that is rotatable about an axis and has a lug or tooth on one side which is coactive with a pinion which serves as a stop element and in some devices also as a motion transmitting element whose hub or body is rotatable about an axis spaced from but parallel to the axis of the driving element and has alternate primary and secondary teeth which are of different lengths longitudinally of the hub, respectively, the driving element having a smooth coaxial cylindrical surface and a notch opening through said surface, and said primary teeth and secondary teeth having a relation to each other and to said cylindrical surface and said notch and to said lug on the driving element such as to permit free continuous rotation of said driving element, said motion-transmitting element and said motor shaft in one direction and to block rotation of said driving element and said motor shaft in the opposite direction.

The invention also provides a unidirectional intermittent driving mechanism wherein said primary teeth of said motion-transmitting element mesh with the teeth of a rotatable motion-receiving element that forms a part of a load to be driven.

A BRIEF DESCRIPTION OF THE DRAWINGS

For a specific understanding of the invention, reference should be had to the following description in conjunction with the accompanying drawings in which:

FIG. 1 is a top plan view of a one-way direction rotation control for synchronous motor shafts embodying the invention and included in the drive mechanism of an elapsed time hour meter which is shown schematically and fragmentarily;

FIG. 2 is a partial elevational and partial sectional view taken approximately on the plane of line 2—2 of FIG. 1, showing the lug on the driving element about to engage the teeth of the motion-transmitting element for free continuous rotation of the driving element in counter-clockwise direction;

FIG. 3 is an enlarged fragmentary side elevational view of a portion of the driving element having the lug, and a portion of the motion-transmitting element, with the lug of the driving element, and the teeth of the motiontransmitting element engaged in the position for stopping rotation of the driving element in the clockwise direction;

FIG. 4 is an enlarged fragmentary elevational view approximately from the plane of line 4—4 of FIG. 3;

FIG. 5 is a perspective view of the motion-transmitting element;

FIG. 6 is a perspective view of the driving element from the side having the lug or tooth;

FIG. 7 is a fragmentary front elevation of a one-way direction rotation control for synchronous motor shafts showing another type of driving connection between the shaft and the driving element with portions broken away and shown in section;

FIG. 8 is a top plan view similar to FIG. 1, of an embodiment of the invention in a drive for an electric switch;

FIG. 9 is a fragmentary sectional view on the plane of line 9—9 of FIG. 8 with portions omitted for clearness in illustration;

FIG. 10 is a top plan view similar to FIG. 8, of an embodiment of the invention in apparatus for driving continuously in one direction a shaft adapted to be drivingly connected to a load; and FIG. 11 is a transverse sectional view on the plane of line 11—11 of FIG. 10.

DESCRIPTION OF THE PREFERRED EMBODIMENT

The one-way rotation control for motor shafts herein disclosed is adapted for use with any motor that has the characteristic that its rotor will run in either a clockwise or a counter-clockwise direction when current is applied, and the specific type and construction of the motor is immaterial. The power source may be either A.C. or D.C. and an example of a self-starting synchronous motor with an electronic control circuit is shown in the copending application of Ronald M. Graziano, Ser. No. 404,174, which includes a bifilar wound coil, a stator, a shaft, a fly wheel, and a permanent magnet type rotor fastened to the shaft and magnetized with multiple poles on its circumference that are out of symmetry with the remaining poles so that the motor is self-starting and the rotor may rotate in either a clockwise or a counter-clockwise direction.

For the purpose of illustrating the principles of the present invention, the one-way rotation control of the invention is shown in conjunction with the self-starting synchronous motor described in U.S. pat. No. 2,436,231 and is generally designated by the reference character A.

The present invention insures that if the motor starts in the "wrong" or undesired direction, the rotation will be quickly blocked for rebound and continued rotation in the "right" or desired direction.

More specifically describing the invention, the motor shaft 1 is shown as journaled in bearings 2 and 3 in the stator core B and in the motor casing C, respectively; and the permanently magnetized rotor D is rigidly connected to the shaft with its poles magnetically coactive with the stator poles that are energized by the coil H so as to cause self-starting and rotation of the shaft in as to cause self-starting and rotation of the shaft in known manner in either clockwise or a counter-clockwise direction depending upon the polarity of the line voltage at the instant power is applied through supply line wires J.

The shaft extends outwardly from the casing and is drivingly connected to apparatus to be driven which for the purpose of explaining the principles of one embodiment of the invention is shown schematically as a known type of elapsed time hour meter and includes a drum type register F comprising a plurality of odometer wheels 4 rotatable on a shaft 5 secured with its axis perpendicular to the axis of the motor shaft in a fame G which is mounted on a stationary support here shown in the drawing as the motor casing, and transfer pinions 6 mounted on a shaft 6a.

The driving connection between the motor and the apparatus to be driven comprises gearing including a worm 7 on the motor shaft meshing with a spiral or worm gear 8 which serves as a driving element and is rotatable about an axis, here shown as the shaft 5. The worm and spiral gear provide for continuous rotation of the motor shaft and said gear in either of opposite directions. In accordance with the invention, means is provided to permit said rotation freely and continuously in one direction and for blocking said rotation in the opposite direction.

To that end one of said transfer pinions, here denoted 6b coacts with the driving element and is utilized as a motion-transmitting element. The pinion has a cylinderical body or hub rotatable on the shaft 6a about an axis that is parallel to the axis of the driving element and spaced from the periphery of the driving element.

The driving element has a circumferential, cylindrical smooth surface 9 and a radial notch 10 opening through said surface and one end surface 11 of the driving element. The driving element also has a lug or tooth 12 projecting from said end surface at one side of said notch to coact with said transfer pinion or motion-transmitting element.

As shown said pinion has a plurality of equidistantly spaced teeth certain of which denoted primary teeth and designated 13 are of a radial length to enter and leave said notch 10 during revolution of the driving element in one direction and are of a length longitudinally of or parallel to the axis of the body to engage said circumferential surface of the driving element, while the alternate or secondary teeth 14 are of a length longitudinally of the body to be engaged by said lug or tooth 12 upon revolution of the driving element in either direction. Each of the secondary teeth 14 and the two primary teeth at opposite sides of each secondary tooth are so related to each other, to said notch 10 and to said lug 12 on the driving element that upon rotation of the driving element in one direction said lug will engage said secondary tooth and rotate said pinion to move one of said primary teeth into and out of said notch 10 of the driving element and dispose both of said primary teeth in contact with said circumferential surface 9 and thereby hold the pinion momentarily against rotation and permit free rotation of the driving element and said motor shaft in said one direction, here the counter-clockwise direction as shown in FIG. 2. When the driving element is urged to rotate in the opposite direction, that is, clockwise, as indicated by the arrow in FIG. 3, said lug will engage said secondary tooth, and the primary teeth which are in contact with said circumferential surface 9 on the driving element will block rotation of the pinion, said driving element and said motor shaft in said opposite clockwise direction, as illustrated in FIG. 3 and 4.

The drum register of the elapsed time hour meter represents the load driven by the synchronous motor. Its construction and operation are well known and therefore they need not be described in detail. As here shown, the motion from the driving element which is rotated continuously in one direction, here clockwise, during running of the motor, is transferred or transmitted to the first odometer wheel 4a once during each revolution by the motion-transmitting element, that is, the first pinion 6b, by engagement of the lug 12 on the driving element with one of the secondary teeth and by meshing of one of the primary teeth with the notch 10 in the driving element and with gear teeth 15 on one side of the odometer wheel when the secondary tooth is engaged by the lug 11 and also meshes with said gear teeth 15.

The invention thus serves as a unidirectional intermittent drive mechanism; and it will be seen that by providing a plurality of lugs 12 and notches 10, the motion-receiving element, here the first odometer wheel, could be actuated several steps instead of one step as shown, during each revolution of the driving element. Also of course the motion-transmitting element may be drivingly connected as by gearing or by direct fixation on a shaft, to any device of a size or nature which the motor is capable of driving.

It will be understood by those skilled in the art that any suitable driving connection between the motor shaft and the driving element is contemplated by the invention. For example, FIG. 7 of the drawings shows the driving element 8a fast connected to a dished gear 16 that has gear teeth 8b on its upturned edges which mesh with a pinion 17 rigidly connected to the shaft 18 of a suitable synchronous motor that is enclosed in a casing 19. The driving element is rotatable about the axis of a shaft 20 which is journaled in a bracket 21, only a portion of which is shown, mounted on the casing. The driving element is otherwise the same as the element 8, and coacts with a motion-transmitting pinion 6d in the same way that the driving element 8 coacts with the pinion 6b. A motion-receiving element 22 and the pinion 6d coact in the same way that pinion 6c coacts with motion-receiving element 4a.

Desirably the lug or tooth 10 has each of opposite sides in the form of a side of a gear tooth, with a portion of one side forming one side of said notch 9; and the lug has an inclined surface 10a facing the notch 9 that will cam the primary tooth out of the position at which there might otherwise be a slight interference between the pinion and the lug 12 as the lug approaches said tooth during clockwise rotation of the driving element.

If it is desired that the free rotation of the driving element be clockwise instead of counter-clockwise, then the tooth 12 will be located at the other side of the notch 9 and with the inclined surface 10a facing the notch.

As shown, each of opposite sides of said lug or tooth 12 has the form of one side of a gear tooth and a portion of one side constitutes one side of the notch 10. The other side of the notch is also curved in the form of one side of a gear tooth.

An embodiment of the invention in a drive for an electric switch is shown in FIGS. 8 and 9. For simplicity of disclosure, the driving mechanism is generally the same as that heretofore described and includes the motor that is the same as that shown in FIG. 1 and is here denoted $A_1$ and has a shaft on which is the worm $7_1$ meshing with a worm gear $8_1$ which serves as the driving element rotatable on the shaft $5_1$ journaled in the frame $G_1$. Odometer wheels $4_1$ are rotatable on shaft $5_1$ and coactive therewith a manner well known in, for example, elapsed time hour meters, to transfer motion from one wheel to the next adjacent wheel are transfer pinions $6_1$ and one of the pinions, here denoted $6_2$ coacts with the teeth $15_1$ of a thick disk $4_2$ which constitutes a part of the load and is rotatable on the shaft-- $5_1$ and actuates an electric switch H.

The driving element has a cylindrical smooth surface $9_1$ and a radial notch $10_1$ like the notch $10_1$ and the driving element also has a lug or tooth $12_1$ like the lug 12. All of the pinions have the same construction as the pinion 6b of FIGS. 1, 2 and 4, and one pinion, here denoted $6_3$ cooperates with the cylindrical surface $9_1$, notch $10_1$ and tooth $12_1$ in the same manner the pinion 6b cooperates with the surface 9, notch 10 and tooth 12 of FIGS. 1, 2 and 4. Thus, the motor and driving element and motion-receiving element 41 are free to rotate continuously in one direction, but are prevented from rotating in the opposite direction.

For the purpose of explaining the invention the switch H is shown as comprising two contacts 17 and 18 formed of magnetic materials enclosed in an evacuated tube 20 that is mounted on the frame $G_1$. These contacts are normally biased apart but are magnetically actuated into engagement with each other when a magnet 19 mounted in periphery of the disc $4_2$ is brought into juxtaposition to the contacts during rotation of the element $4_2$.

FIGS. 10 and 11 illustrate an embodiment of the invention in apparatus for driving a load continuously in one direction and wherein the pinion serves solely as a stop element and does not function as a motion-transmitting element.

Here the motor $A_2$ may be the same as motor A and its shaft has thereon a worm $7_3$ meshing with the worm gear driving element $8_2$ that is rotatable on shaft $5_3$ in a frame $G_3$. The driving element includes a coaxial main spur gear 21 which in turn meshes with a secondary gear 22 that is rigidly mounted on a countershaft 23 which in turn is adapted to be drivingly connected to a load, for example, a shaft of a machine.

For permitting the motor shaft and the driving element to rotate freely and continuously in one direction and for preventing rotation thereof in the opposite direction, on one end of the gear 21 is a smooth cylindrical surface $9_4$ like the surface 9, a notch $10_4$ like the notch 10 and a lug or tooth $12_4$ like the lug or tooth 12, with which coacts a pinion $6_4$ which has the same construction as pinion 6b. The coaction of the pinion $6_4$ with the surface $9_4$, notch $10_4$ and tooth $12_4$ and the function or result thereof are the same as the coaction of the pinion 6b with the surface 9, notch 10 and tooth 12 described hereinbefore, (pages 7, 8, 9, 10).

I claim:

1. The combination with the shaft of a synchronous motor that is capable of starting to rotate in either direction when current is applied, a driving element rotatable about an axis, a driving connection between said shaft and said element providing for continuous rotation of said shaft and said element by said shaft in either of opposite directions, and means permitting said rotation freely in one direction and for blocking rotation in the opposite direction, said means comprising a pinion having a cylindrical body rotatably mounted on an axis parallel to said axis of the driving element and disposed in spaced relation to the periphery of said driving element, said driving element having a circumferential smooth surface and a notch opening through said circumferential surface and one end surface of said driving element and also having a lug projecting from said end surface at one side of said notch, said body of said pinion having a plurality of equidistantly circumferentially spaced teeth, certain of which denoted primary teeth are of a radial length to enter and leave said notch during revolution of said driving element in one direction and are of a length longitudinally of said body to engage said circumferential smooth surface of said driving element while alternate teeth denoted secondary teeth are of a length longitudinally of the said body to be engaged by said lug on said driving element upon revolution of said element in either direction, each of said secondary teeth and the two of said primary teeth at opposite sides of each secondary tooth being so related to each other, to said notch and to said lug on said driving element that upon rotation of said driving element in one direction said lug will engage said secondary tooth and rotate said pinion to move one of said primary teeth into and out of said notch in the driving element and dispose both of said two primary teeth in relatively slidable contact with said circumferential surface of the driving element and thereby hold the pinion momentarily against rotation and permit free rotation of said driving element and said motor shaft in said one direction, while when the driving element is urged to rotate in the opposite direction said lug will engage said secondary tooth so that said primary teeth which are in contact with said circumferential surface on the driving element will block rotation of said pinion and said driving element and said motor shaft in said opposite direction.

2. The combination as defined in claim 1 with the addition of a driving connection between said pinion and a load to be driven upon rotation of said driving element in the first-mentioned direction.

3. The combination as defined in claim 2 wherein said driving connection comprises a motion-receiving element which is a part of said load and is revolubly mounted coaxially with said driving element and has gear teeth to mesh with said primary teeth on said pinion as each of said primary teeth enters and leaves said notch and is engaged by said lug on said driving element, whereby to rotate said motion-receiving element step-by-step in one direction during continuous revolution of said driving element.

4. The combination as defined in claim 1 wherein each of opposite sides of said lug is in the form of one side of a gear tooth and a portion of one side constitutes one side of said notch in the driving element and has an inclined surface at its outer end to cam the primary teeth of the pinion out of the position at which otnerwise interference might occur between said primary teeth and said lug during rotation of the driving element in the direction to be blocked.

5. The combination as defined in claim 1 with the addition of a driving connection between said driving element and a load to be driven.

6. The combination as defined in claim 1 wherein said driving element includes a main gear on which is disposed said circumferential smooth surface with said notch opening therethrough, and a secondary gear meshing with said main gear and mounted on a shaft whose axis is parallel to the axis of rotation of the driving element.

7. The combination as defined in claim 3 with the addition of an electric switch including two contact members and means connected to and rotatable by said motion-receiving element to actuate one of said contact members into contact with the other contact member for closing the switch upon rotation of said driving element in the first-mentioned direction.

* * * * *